March 30, 1965 T. G. WILLIAMS 3,175,453
LOCKING PIN ASSEMBLY HAVING A SPRING CLIP
Original Filed Dec. 9, 1959

INVENTOR.
Thomas G. Williams
BY
Shoemaker and Mattare
ATTYS.

United States Patent Office 3,175,453
Patented Mar. 30, 1965

3,175,453
LOCKING PIN ASSEMBLY HAVING A
SPRING CLIP
Thomas G. Williams, Newport News, Va., assignor to
Newport News Shipbuilding and Dry Dock Company,
Newport News, Va., a corporation of Virginia
Continuation of application Ser. No. 858,487, Dec. 9,
1959. This application July 20, 1962, Ser. No. 215,474
2 Claims. (Cl. 85—8.3)

The present application is a continuation of my copending U.S. patent application Serial No. 858,487, filed December 9, 1959 and now abandoned.

This invention relates to locking pins in general and pertains more particularly to certain economical and practically feasible improvements therein.

As a specific example of the use of this invention, the same is primarily contemplated for use in conjunction with stanchions aboard ship. Conventionally, a toggle type of locking pin is utilized to detachably connect a stanchion to its socket. Since the stanchions are conventionally made from pipe or tubular stock, it frequently occurs that the toggle portion will open as the pin is being inserted and during the time that the toggle is actually inside the tubular stock or pipe. Naturally, when this occurs, it is substantially impossible without a great deal of effort to re-position the toggle so that the pin can be either inserted fully or withdrawn. Accordingly, the present invention contemplates improvements in locking pins specifically provided for the above purpose, that is, in conjunction with stanchions aboard ship and in connection therewith, the present invention, more specifically, contemplates the provision of a spring clip member to be inserted through the free end of a locking pin and preventing its withdrawal until the clip is removed.

A further object of this invention resides in the provision of an improved spring clip member for use in conjunction with locking pins, which spring clip is of economical construction and wherein its configuration is such as to permit easy insertion and withdrawal thereof while at the same time providing adequate holding action thereof to prevent withdrawal of the associated locking pin.

Another object of this invention is to provide a spring clip for locking pins provided with an arched portion for embracing one side of a locking pin and which arched portion terminates in an end cooperable with the insertable shank of the clip to permit easy insertion of the clip, the arch construction itself permitting ready withdrawal of the clip.

Another object of this invention is to provide an improved spring clip for use in conjunction with a locking pin, such spring clip having a coiled eye portion which lends resiliency to the clip member and having an arched portion in one leg thereof terminating in a looped end of such configuration as to cooperate with a straight leg or shank portion of the clip to permit ready insertion of the clip in the associated locking pin.

Another object of this invention is to provide a spring clip for locking pins which is characterized by its ease of insertion and by a construction which obviates the danger of injury when being removed and which embodies in its construction a configuration permitting of easy removal while at the same time effecting an efficient holding or locking action.

Another object of this invention is to provide a locking pin assembly in combination with a stanchion, including a locking pin, a spring clip therefor to prevent withdrawal of the pin from its operative position in the stanchion, and a flexible connector attaching the clip to the pin and having anchoring means therefor attached to the stanchion so that neither the spring clip nor the pin can be separated therefrom, precluding inadvertent loss of the locking pin assembly.

A further object of this invention is to provide an improved locking pin assembly including an improved form of spring clip which includes a straight leg portion for insertion through a corresponding transverse bore in the locking pin, there being an arched leg portion connected to the first leg through a coiled section imparting resiliency to the clip and which arched portion is adapted to overlie and embrace one side of the associated locking pin, the arched leg terminating in a looped end portion engaged in close proximity to the straight leg and forming therewith on either side thereof channels whereby the clip is easily cammed either into or out of engagement with the pin.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

Figure 1:
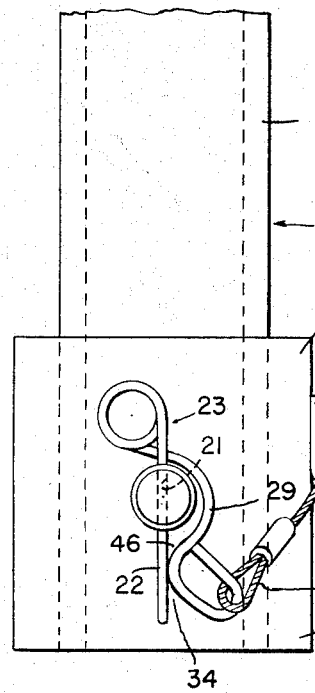
FIG. 1 is a vertical elevation showing the spring clip operatively connected with the locking pin and illustrating details of the spring clip and its manner of connection to the pin.
Figure 2:
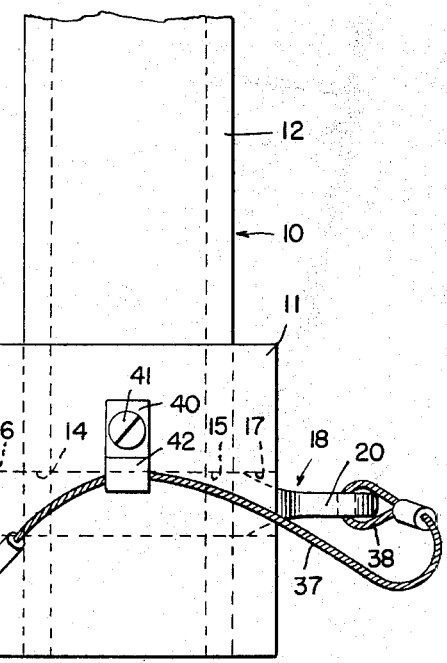
FIG. 2 is a side elevational view of the assembly shown in FIG. 1.

Referring more particularly at this time to FIGS. 1 and 2, reference numeral 10 indicates in general a stanchion assembly such as is used aboard ship particularly around hatches. The stanchion assembly includes a socket or base 11 into which is removably received the lower end of a post 12. The upper end of the post, which is not shown, is provided with means by which the post is attached to a chain extending between adjacent posts, as is well understood. However, the present invention is not necessarily limited to this type of assembly solely since as will hereinafter be obvious, the invention has utility in connection with locking pin assemblies in general.

In the particular assemblage shown, the post 12 is normally of tubular configuration and indeed may be comprised of a section of pipe.

The base 11 is likewise tubular or otherwise in the form of a socket and its lower end 13 is provided with any convenient means, not shown, so that the base or socket is attached to the deck. As is shown most clearly in FIG. 2, the post 12 adjacent its lower extremity is provided with diametrically aligned openings 14 and 15 and the socket or base is likewise provided with diametrically opposed openings 16 and 17 which are aligned with the openings in the post so that when the post is received in the socket the openings can all be disposed in aligned relationship. These openings are adapted to receive a locking pin indicated generally by the reference character 18 having an elongate shank 19 and having an enlarged head at one end such as the flattened enlarged head portion 20 shown in FIG. 2.

The shank 19 of the pin is of sufficient length as to extend completely through the socket or base 11 and project therebeyond. The projecting portion of the shank is provided with a transverse, diametrically extending bore 21, see particularly FIG. 1, adapted to receive therethrough one leg 22 of a spring clip assembly indicated generally by the reference character 23. The spring clip is so constructed and arranged as to be easily inserted into and withdrawn from the locking pin while at the same time it is securely held in place with relation to the locking pin. The purpose of the spring clip is to prevent accidental removal of the locking pin 18 but yet readily permitting the pin to be withdrawn, when desired, so that the post 12 can be removed from the socket.

Figure 3:
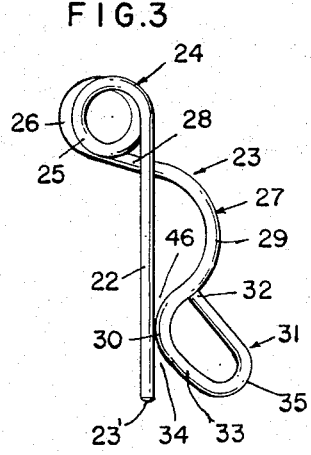
FIG. 3 is an enlarged view of the spring clip.

The details of the spring clip are shown more clearly in FIG. 3 and will be seen to include the aforementioned elongate generally straight leg 22 having a free end portion 23' and having its opposite end merging into a spring coil portion indicated generally by the reference character 24 which may include one or more coils 25 and 26, substantially as shown. The coils are preferably wound upon a common center, lying on top of each other and the coil 26 remote from the leg 22 merges with a second leg indicated generally by the reference character 27.

The second leg 27 has one portion 28 immediately adjacent the coil 26 and stemming therefrom which crosses the straight leg 22 and merges smoothly with an arched or generally semi-circular portion 29. The arched portion 29 has the end 30 remote from the portion 28 which lies either in close adjacency to or touches a point on the straight leg 22 spaced from the free end portion 23' thereof and the leg 27 terminates beyond this point in a loop indicated generally by the reference character 31. The loop 31 is brought back around, in the specific embodiment shown in FIG. 3, so that its terminal end portion 32 engages against an intermediate portion of the arch 29 so as to form a closed loop therewith and with the initial portion 33 of the loop 31 being extended angularly away from the straight leg 22 to define a crotch 34 therebetween. In this fashion, the loop 31 presents a heel 35, the purpose of which will be presently apparent.

FIGS. 2 and 3 disclose further details of the spring clip. The spring clip of these figures comprises a coil and two dependent legs, said coil comprising a plurality of turns, one end of the coil extending in a clockwise direction and merging into a straight leg which extends throughout its length tangentially therefrom, the other end of said coil extending in a counter-clockwise direction and merging into a curved leg which in that portion thereof adjacent the coil extends in a tangential direction from a point spaced circumferentially from the point from which said straight leg extends from the coil, said portion of the curved leg extending across said straight leg at a point spaced from the coil toward the free end of said straight leg and merging into a portion comprising two substantially 90 degree angle turns which terminate in said curved leg extending parallel to its initial tangential direction in a plane containing the said straight leg, said curved leg next comprising a generally semi-circular portion which lies in the said plane and which portion ends in contact with the straight leg, said curved leg terminating in a loop which forms a V-shaped notch with said straight leg and turns back on and ends in contact with the semi-circular portion.

The loop 31, as can be seen best in FIGS. 1 and 2, is engaged with the bight 36 of a flexible connector 37 extending therefrom and terminating at its opposite end in a further bight 38 which is engaged through a suitable opening in the flattened enlarged head 20 at the end of the locking pin remote from the point of connection with the spring clip. A suitable anchoring means or guide retainer 40 is secured to the tubular base member 11 as by a suitable screw fastener 41 and the like. The anchor means includes a looped outwardly extending portion 42 defining an opening through which the intermediate portion of the flexible connector can freely run. It is evident that this anchor means will permit the flexible connector to be moved freely back and forth therewithin and yet at the same time the opening through the anchor means is sufficiently small such that the enlarged end portions of the flexible connector can not pass therethrough whereby the flexible connector, the locking pin, and the spring clip member are permanently anchored to the base member so that they can be physically removed therefrom. This is an important feature on shipboard wherein the post of the stanchion assembly is often removed from the base member. It is essential that the locking pins always be readily available, these items being very susceptible to loss if not fixed to the assembly. The anchor means assures that the locking pin will always be in a handy, readily available position and that it cannot possibly become lost. It is, of course, evident that while the anchor means serves to retain the locking pin and spring clip as described above, it at the same time does permit ready manipulation of the locking pin and spring clip so that these elements can be easily manipulated into operative position.

The spring clip 23, where the portion 28 joins the arch 29, is deformed laterally, as indicated by the reference character 45 in FIG. 2 so that the arch 29 and the loop 31 lie in a plane common with a plane containing the leg 22 which is generally at right angles to the axes of the coils 25 and 26.

Thus, as can be best seen in FIG. 1, when the leg 22 is inserted through the bore 21 in the locking pin, the arch 29 embraces roughly one half of the locking pin and prevents accidental withdrawal of the spring clip such as would permit undesired withdrawal of the locking pin.

When the spring clip is initially engaged with the locking pin, it will be obvious that the crotch 34, being defined between convergent portions of the loop 31 and the leg 22, will permit of a camming action to spread the arch and loop, particularly in the region of the portion 30, away from the leg 22 and allow the locking pin to pass therebetween until the parts have reached the position as is shown in FIG. 1. The arch 29 itself, by virtue of its configuration, presents a further crotch 46 which readily permits withdrawal of the spring clip 23 when desired. When withdrawing the spring clip, normal practice is to push against the heel 35 of the loop 31 with the thumb or finger and since this loop presents a heel 35 which is blunted, no danger of injury to the person so removing the clip is present. At the same time, it will be appreciated that the material from which the spring clip is made is of sufficient gauge and resiliency as to effect a good holding action of the spring clip on the locking pin so that the spring clip will not accidentally be removed.

Figure 4:
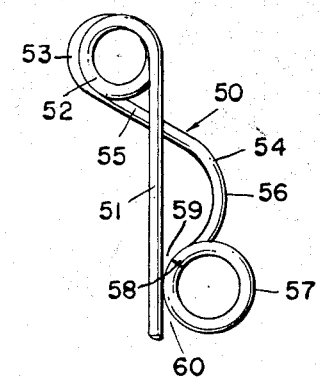
FIG. 4 is an enlarged view of a modified form of the spring clip.

FIG. 4 illustrates a modified form of the spring clip indicated generally by the reference character 50 and includes a straight leg 51 merging with coils 52 and 53 at one end and having a further leg 54 including the portion 55 issuing from the coil 53 and crossing over the leg 51 and joined thereafter with the arched portion 56 which terminates in a loop 57 which has an end portion 58 overlying a portion of the arch 56. The loop, constructed in accordance with FIG. 4, may be more readily made than the loop 31 of FIG. 3. The arch 56 and loop 57 respectively form the crotches 59 and 60 similar to the crotches 46 and 34 respectively described in conjunction with FIG. 3.

I claim:

1. A locking pin assembly comprising an elongate pin having an enlarged head at one end and having a transverse bore at its opposite end, an elongated flexible member having one end secured to said head, a spring clip comprising a coil and two dependent legs, said coil comprising a plurality of turns, one end of the coil extending in a clockwise direction and merging into a straight leg which extends throughout its length tangentially therefrom, the other end of said coil extending in a counter-clockwise direction and merging into a curved leg which in that portion thereof adjacent the coil extends in a tangential direction from a point spaced circumferentially from the point from which said straight leg extends from the coil, said portion of the curved leg extending across said leg at a point spaced from the coil toward the free end of said straight leg and merging into a portion comprising two substantially 90 degree angle turns which terminate in said curved leg extending parallel to its initial tangential direction in a plane containing the said straight leg, said curved leg next comprising a generally semi-circular portion which lies in the said plane and which portion ends in contact with the straight leg, said curved leg terminating in a loop which forms a V-shaped notch with said straight leg and turns back on and ends in contact with the semi-circular portion, the other end of said flexible member being connected to the loop of said spring clip.

2. In combination, a tubular member for slidably receiving a stanchion and a stanchion with a transverse passageway therethrough, said tubular member being formed with a transverse passage adapted to be aligned with said passageway, a locking pin assembly comprising a pin having an enlarged head at one end and a transverse bore at its opposite end, adapted to extend through said passageway and passage for securing said tubular member to said stanchion, said pin assembly further comprising an elongated flexible member having one end secured to said head and another end provided with an aperture, a spring clip comprising a coil and two dependent legs, said coil comprising a plurality of turns, one end of the coil extending in a clockwise direction and merging into a straight leg which extends throughout its length tangentially therefrom, the other end of said coil extending in a counterclockwise direction and merging into a curved leg which in that portion thereof adjacent the coil extends in a tangential direction from a point spaced circumferentially from the point from which said straight leg extends from the coil, said portion of the curved leg extending across said leg at a point spaced from the coil toward the free end of said straight leg and merging into a portion comprising two substantially 90 degree angle turns which terminate in said curved leg extending parallel to its initial tangential direction in a plane containing the said straight leg, said curved leg next comprising a generally semi-circular portion which lies in the said plane and which portion ends in contact with the straight leg, said curved leg terminating in a loop which forms a V-shaped notch with said straight leg and turns back on and ends in contact with the semi-circular portion, said loop extending through the aperture on said flexible member, and an anchor member having an opening therethrough, said elongated flexible member having a central portion slidably extending through said opening, said opening being so small as to prevent passage of either said pin or said spring clip therethrough, and means on said anchor member for securing it to the tubular member.

References Cited by the Examiner

UNITED STATES PATENTS

| | | | |
|---|---|---|---|
| 2,000,757 | 5/35 | Holczer | 85—8.9 |
| 2,399,119 | 4/46 | Howell | 85—8.3 |
| 2,900,864 | 8/59 | Chapman et al. | 85—8.9 |

FOREIGN PATENTS

| | | |
|---|---|---|
| 123,461 | 2/19 | Great Britain. |

EDWARD C. ALLEN, *Primary Examiner.*